(12) United States Patent
Raad

(10) Patent No.: US 6,844,707 B1
(45) Date of Patent: Jan. 18, 2005

(54) AC/DC BRUSHLESS STARTER-GENERATOR

(75) Inventor: Bernard A. Raad, Oxnard, CA (US)

(73) Assignee: Pacific Scientific/Electro Kinetics Division, Carpenteria, CA (US)

( * ) Notice: Subject to any disclaimer, the term of this patent is extended or adjusted under 35 U.S.C. 154(b) by 0 days.

(21) Appl. No.: 10/748,530

(22) Filed: Dec. 30, 2003

(51) Int. Cl.⁷ .............................................. F02N 11/08
(52) U.S. Cl. ........................... 322/29; 322/1; 322/29; 322/59; 322/60; 322/73; 290/40; 290/46
(58) Field of Search .............................. 322/1, 29, 59, 322/60, 73, 10; 290/40, 46

(56) References Cited

U.S. PATENT DOCUMENTS

| | | | |
|---|---|---|---|
| 3,908,161 A | * | 9/1975 | Messenger ..................... 322/1 |
| 4,330,743 A | | 5/1982 | Glennon |
| 4,481,459 A | | 11/1984 | Mehl et al. |
| 4,743,777 A | | 5/1988 | Shilling et al. |
| 4,947,100 A | | 8/1990 | Dhyanchand et al. |
| 4,968,926 A | | 11/1990 | Dhyanchand |
| 5,013,929 A | | 5/1991 | Dhyanchand |
| 5,015,941 A | | 5/1991 | Dhyanchand |
| 5,031,086 A | | 7/1991 | Dhyanchand |
| 5,036,267 A | | 7/1991 | Markunas et al. |
| 5,055,700 A | | 10/1991 | Dhyanchand |
| 5,055,764 A | | 10/1991 | Rozman et al. |
| 5,068,590 A | | 11/1991 | Glennon et al. |
| 5,097,195 A | | 3/1992 | Raad et al. |
| 5,194,801 A | | 3/1993 | Rozman |
| 5,309,081 A | | 5/1994 | Shah et al. |
| 5,325,042 A | | 6/1994 | Murugan |
| 5,363,032 A | | 11/1994 | Hanson et al. |
| 5,493,200 A | | 2/1996 | Rozman et al. |
| 5,512,811 A | * | 4/1996 | Latos .......................... 322/10 |
| 5,581,168 A | | 12/1996 | Rozman et al. |
| 5,594,322 A | * | 1/1997 | Rozman ....................... 322/10 |
| 5,850,138 A | | 12/1998 | Adams et al. |
| 5,998,894 A | | 12/1999 | Raad |

* cited by examiner

*Primary Examiner*—Nicholas Ponomarenko
*Assistant Examiner*—Iraj A. Mohandesi
(74) *Attorney, Agent, or Firm*—Barnes & Thornburg

(57) ABSTRACT

A brushless AC/DC starter generator for use with aircraft engines, the starter generator capable of both providing motive force to start the engine, and generate AC and DC power for aircraft systems. The apparatus includes a main generator, an exciter generator, and a permanent magnet generator.

21 Claims, 4 Drawing Sheets

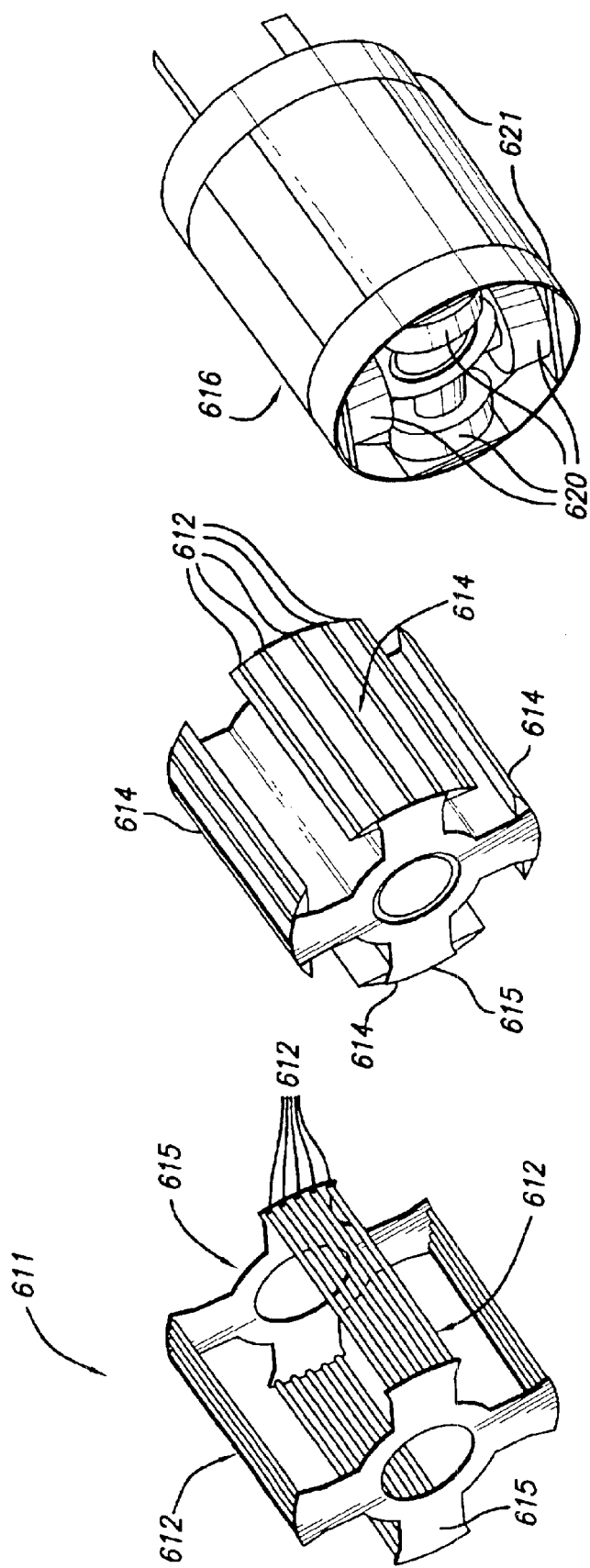

AC/DC BRUSHLESS STARTER-GENERATOR

BACKGROUND

The disclosure relates to aircraft engine starters and generators. The single brushless unit described herein replaces a traditional brush-type starter-generator and a smaller AC generator typically used. The former is typically used to start the engine and, once the engine has been started, to generate main power DC for the aircraft. The latter is typically used as an AC source to deice the windshield, other airplane components or to serve as a variable frequency source of electric power on the aircraft. The advantages of the apparatus described here are redundancy, heightened reliability, lower weight, increased time between overhauls, and lower cost of ownership, in a design that does not affect gearbox configuration. Furthermore, this device can incorporate other features, such as an auxiliary bearing system and bearing failure indicator, described by the same inventor in U.S. Pat. No. 5,998,894.

BRIEF DESCRIPTION OF THE DRAWINGS

FIG. 2 is a perspective view of the amortisseur or damper winding for the main generator.

FIG. 3 is a perspective view of the rotor core assembly of the main generator.

FIG. 4 is a perspective view of a wound and assembled main generator rotor.

DETAILED DESCRIPTION

Disclosed is a synchronous, "three-in-one", brushless, self-excited generator. It includes: i) a main stator and rotor, the stator having two armatures so as to provide two outputs, including both DC and AC current; ii) an exciter stator and rotor, or field and armature respectively, for brushless operation; iii) and a Permanent Magnet Generator (PMG) exciter stator and rotor, or armature and field respectively, for true, self-excited operation.

The main stator is wound with two outputs. A first output is a polyphase winding that supplies power to DC loads by way of a rectifier stage. On a typical aircraft, this output powers main communications equipment, fuel pumps, electric fans, navigation electronics, or other devices requiring DC electric power. A second output is also polyphased and supplies AC loads such as heating, deicing, and other frequency insensitive elements. For the purposes of this disclosure it is assumed that the DC portion of generator power is the greater of the two, although it is understood that the power may be divided equally between AC output and DC output, or the AC capacity could be made to exceed the DC capacity.

Considering the typical aircraft configuration that requires 12 kW of DC and 3 kW of AC power, the DC generator usually has a greater output than the AC generator. Thus, in the device described herein, it is preferable to motorize the engine at start up using the DC generator, for increased torque delivery. For this purpose, a bypass terminal is provided between the armature output and the rectifier diodes of the first or DC output, which makes the windings, and the AC power, of the DC output accessible to transform the generator into a starter. An auxiliary bearing system and bearing failure indicator are also incorporated to permit "on condition" operation. Such a system is fully described in U.S. Pat. No. 5,998,894, which is incorporated by reference into this specification in its entirety.

Figure 1:
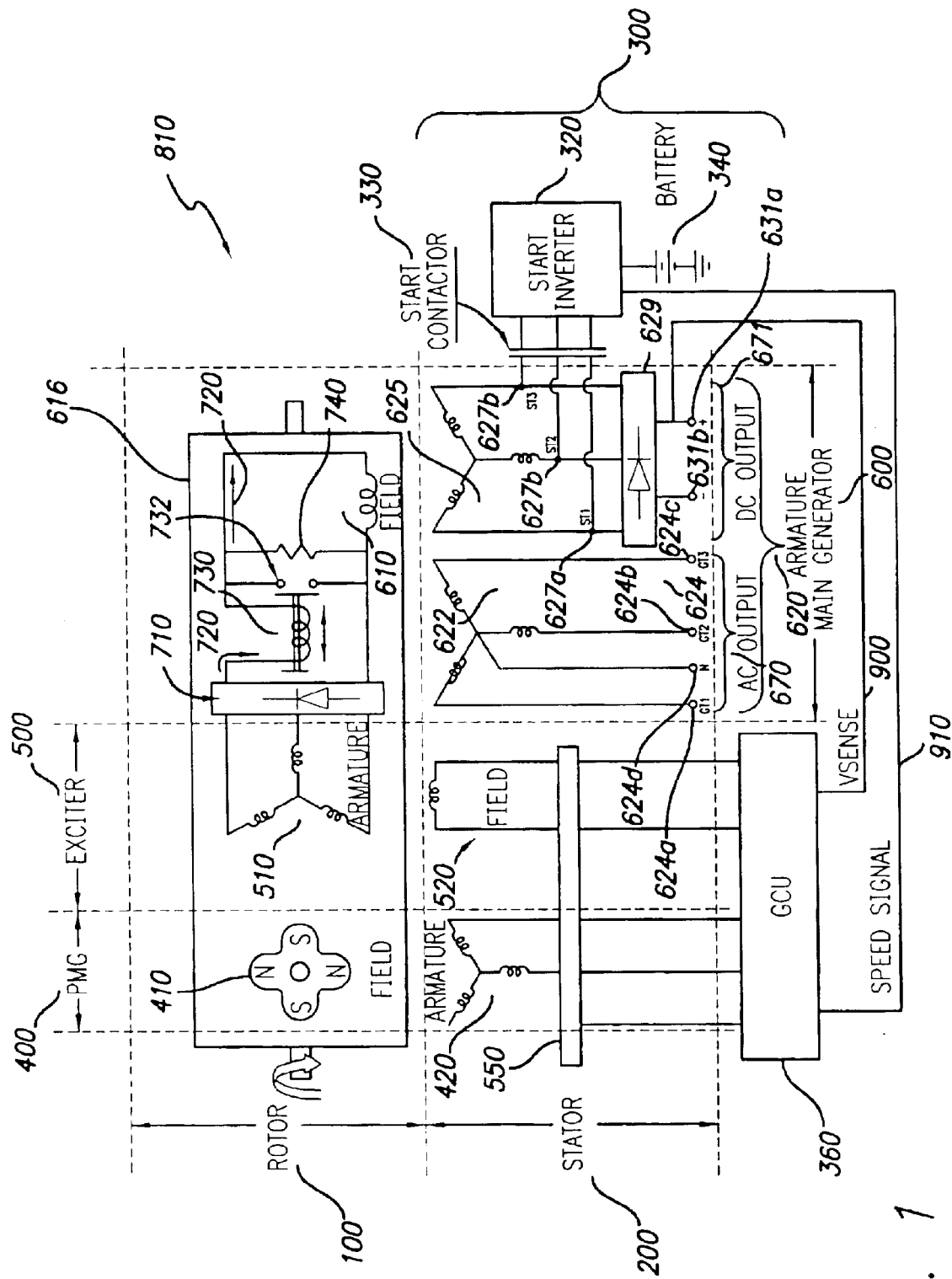
FIG. 1 is a drawing showing the main components of the AC/DC brushless starter generator.

With reference to FIG. 1, the apparatus is described in three major sections. One will recognize that the schematic shown in FIG. 1 is not a technical scale drawing, and is meant to show the relationship of the components. The schematic is arranged to show two major sections of the apparatus vertically: Rotor Assembly 100 and Stator Assembly 200. The schematic of FIG. 1 is further subdivided horizontally into four sections: Permanent Magnet Generator (PMG) 400, exciter generator 500 and main generator 600. Also shown are external equipment 300 used to accomplish the start function in a brushless manner, and the Generator Control Unit (GCU) 360, used to power a field in the exciter generator 500. One skilled in the art will recognize that this equipment may be included in a housing with the stator and rotor, or they may be located external or remote.

As its name implies, PMG 400 includes a permanently magnetized field 410 on the rotor assembly 100 and an armature 420 on the stator assembly 200. The armature 420 on the stator 200 interacts with the magnetic field winding 520 of the rotor assembly 100 to generate electrical power. The PMG 400 is used to provide an independent source of power that is provided to the Generator Control Unit (GCU) 360. The GCU 360 provides electrical power to the magnetic field 520 of the exciter generator 500, even under most fault conditions. The PMG armature 420 is shown here as a three-phased, wye-connected device, but may be wound in various other configurations, depending on the needs of the final application. For example, a redundant, thermally isolated output may be included, or an additional coil may be included to provide a speed signal to the start inverter 320.

The exciter generator 500 also includes an armature 510 and a magnetic field winding 520. The exciter generator 500 differs from the PMG 400 in two major aspects:

1. Its magnetic field generated by the magnetic field winding 520 is not permanent, but takes the form of a controllable electromagnet. Thus, it includes a metal, preferably a steel core and a coiled winding.

2. Its controllable magnetic field is kept stationary while its armature 510 is placed on the rotor shaft, making the armature 510 part of the of the rotor assembly 100. Similarly, the magnetic field winding 520 is part of the stator assembly 200.

Similar to its counterpart armature 420 in the PMG 400, the armature 510 of the exciter 500 is made up of a core of stacked laminations, wound as a polyphased circuit. This is shown in FIG. 1 as a wye-connected device. The armature 510 may be wound in other configurations depending upon the needs of the final application. Connector 550 interfaces the PMG armature 420 and exciter magnetic field winding 520 with the GCU 360. The connector 550 can be any connector so long as it has sufficient terminals for the application.

The GCU 360 provides a speed signal 910 to the start inverter. Also it is provided with a voltage signal 900 from the DC output 671 of the main generator 600. This allows the GCU 360 to regulate the output of the main generator 600 by adjusting the strength of exciter magnetic field.

The output of exciter armature 510 is AC. Before it can be used to energize the rotating field 610 of the main generator 600, it must be converted to DC by rectifier stage 710. On its way to energizing the rotating magnetic field 610 of the main generator 600, the DC current 720 energizes the coil of a field-shorting switch 730, thereby activating the normally closed switch. Activating the field-shorting switch 730 opens contacts 732 and allows the DC current 720 to flow to the rotating magnetic field 610. A surge suppression resistor 740 protects the rotating rectifier stage 710 from surges induced by induction created by the magnetic field 610 or the apparatus used to create the rotating magnetic field. The surge suppression resistor 740 is preferably sized at 50 times the resistance of the coil or inductor creating the rotating magnetic field 610, so that in the forward direction, the current passed through the resistor is only a small fraction of the DC current 720.

The component creating the main generator rotating magnetic field 610 is similar to the component creating the exciter field 520. Preferably it is created by a metal core wound with copper coils to form a controllable electromagnet. One will recognize that various constructions to create an electromagnet can also be used to create the rotating magnetic field 610 or exciter field 520. The electromagnet creating the main generator rotating magnetic field 610 is placed on the shaft of the rotor 100, and interacts with the main generator armature 620 to produce electricity, as is well known in the art.

The main generator armature 620 includes components to provide both AC and DC output. These components include a semi-regulated AC armature assembly 622 and a fully regulated armature assembly 625. As shown in FIG. 1, the semi-regulated AC armature assembly 622 is preferably a wye-connected three-phased winding that terminates in generator terminals 624a, 624b, 624c, and neutral terminal 624d, thus providing an AC output 670. The fully regulated armature assembly 625 is constructed to provide AC current, but also includes a rectifier stage 629 to convert the current to DC. The rectifier stage 629 is electrically connected to positive 631a and negative terminals 631b, to provide a DC output 671. The fully regulated assembly 625 also includes AC terminals 627a, 627b and 627c that are used to bypass the rectifier stage 629 when the apparatus is in a start mode.

With reference to FIGS. 1 through 4, the main generator rotor 616 is constructed so that the rotor 616 also includes an "amortisseur" or damper winding 611. In the four pole construction shown in FIGS. 2–4, the preferred construction of the damper winding includes copper bars 612, placed within the pole faces 614, and attached at each end to copper end plates or laminations 615. One skilled in the art will recognize that other materials may be used for construction of the damper winding 611. A typical damper winding 611 in a four-pole main rotor is shown for illustrative purposes, but one skilled in the art will recognize that this application of a damper winding applies equally well to any number of pole pairs. FIG. 4 shows a completely wound and assembled rotor 616, including windings 620 and wedging system 621.

The damper winding 611 plays an important role in both the generate and start modes. When the invention herein is used as a salient-pole, synchronous generator, the amortisseur circuit or damper winding 611 performs three functions:

1. Mechanical: the cage formed by the axial copper bars 612 attached to the end plates 615 supplements the core-bonding agent and helps retain together the stack of laminations typically used to form the rotor core.

2. Unbalanced Loading: by reacting to individual phase currents in the armature 622, the amortisseur circuit helps even out voltages between phases that are loaded unevenly.

3. Transient recovery: by controlling the subtransient reactance of the main generator 600, the amortisseur circuit implements a critically damped system to assist in a controlled voltage recovery during transient loads.

In a start mode, the amortisseur circuit or damper winding 611 is used as a partial "squirrel cage" that helps produce the magnetic attraction necessary to turn the main generator 600 into an asynchronous motor.

Figure 5:
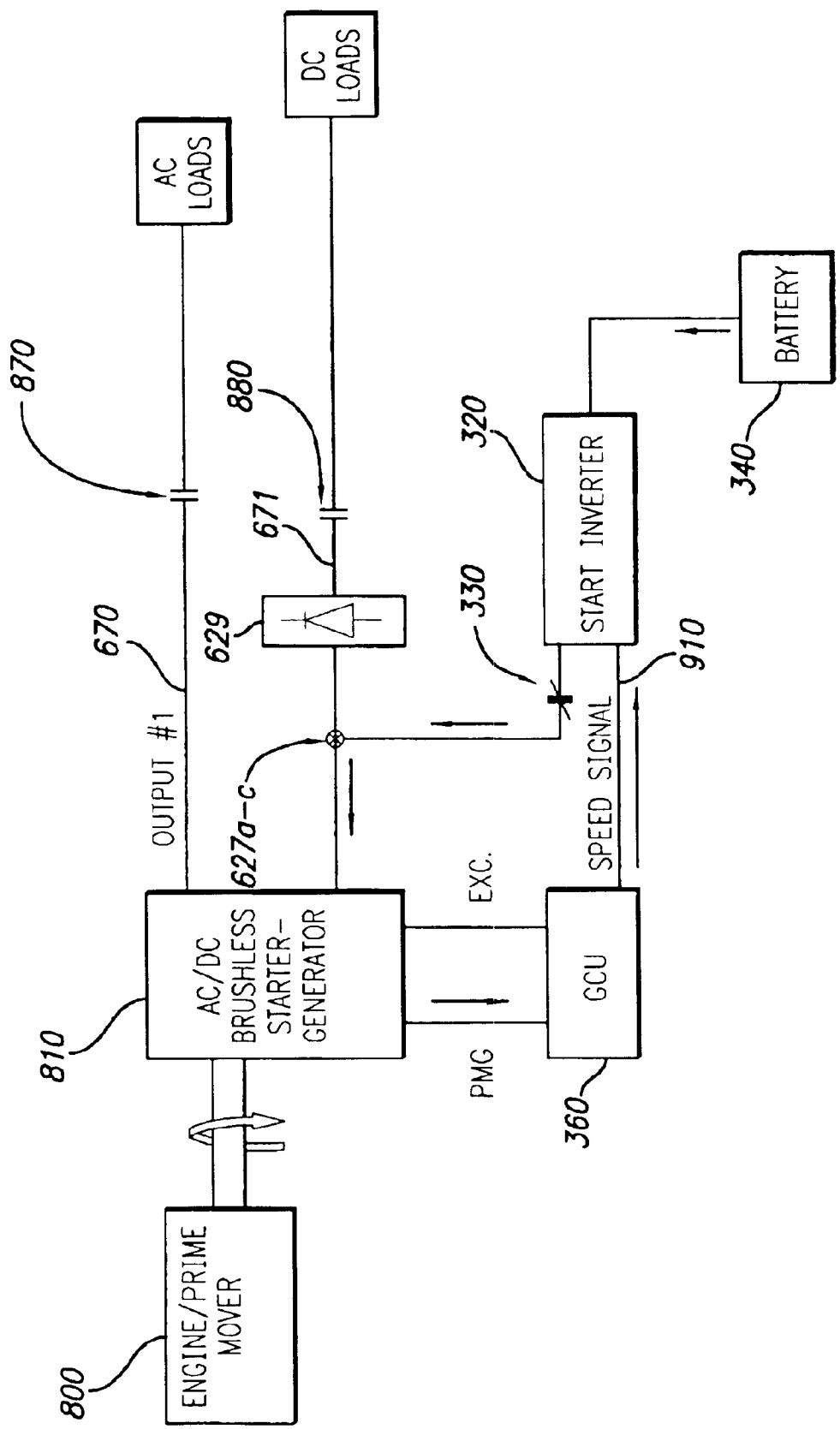
FIG. 5 is a drawing showing the sequence of operation in start mode.

The components involved in the start mode are shown in FIGS. 1 and 5. One skilled in the art will recognize that FIG. 5 is not an electrical schematic, but is meant to assist in explaining how the components interact. The components primarily involved in the start mode include the following:

1. An aircraft engine or prime mover 800.

2. The AC/DC brushless starter-generator 810, the subject of this application, shaft-coupled to the aircraft engine 800. As previously described, the main generator 600 of the AC/DC brushless starter-generator 810 includes two armatures assemblies, 622 and 625, which are both capable of AC operation, however, armature assembly 625 is connected to rectifier stage 629 to provide a DC output 671. The armature assembly 625 includes terminals 627a–c to bypass the diodes of the rectifier stage 629 when in start mode.

3. The generator control unit (GCU) 360 electrically connected to the start inverter 320, so as to send a speed signal 910 to the start inverter 320. The GCU 360 is also electrically connected to the PMG 400 and the Exciter Generator 500.

The GCU 360 is electrically connected to the PMG 400 to provide information regarding the rotational speed of the rotor 100, so that the GCU 360 can generate speed signal 910. The GCU 360 is also electrically connected to the Exciter Generator 500, so that the GCU can regulate the strength of magnetic field.

4. The start inverter 320, electrically connected to terminals 627a–c and to a battery 340, or other DC power source. The GCU 360 and start inverter 320 are shown as separate components, but may be housed together.

5. The start contactor 330 to selectively connect the output of the start inverter 320 to the armature assembly 625 by way of terminals 627a–c.

6. The line contactors 870 and 880 to selectively connect or disconnect the AC and DC loads.

For the start mode, line contactors 870 and 880 are opened removing the loads form the outputs 670 and 671. Start contactor 330 is closed, placing start inverter 320 in electrical contact with the armature assembly 625. This allows the start inverter 320 to transform DC power from the battery 340 into AC current at low voltage and low frequency, typically 5% of the rated frequency. The start inverter 320 is capable of varying the voltage and frequency of the AC power supplied to the armature assembly 625. The AC power is then delivered to the armature assembly 625 through terminals 627a–c, thereby energizing the three phases of the armature assembly 625. The AC power in the armature assembly 625 becomes a rotating magnetic field that, by induction across the air gap between the stator 200 and rotor 100, interacts with the amortisseur circuit 611 exerting a rotational force on the rotor 100, causing the rotor 100 to begin turning. The normally closed solenoid switch 730, and closed contacts 732, provide a shorted path to i) protect rectifiers 710 from transients and spikes generated by field 610 while in start mode; ii) maximize the torque/amp of the synchronous generator when acting as an induction motor.

A speed signal is derived by the GCU 360 from the PMG 400 output, and the speed signal is delivered to the start inverter 320. The start inverter 320, sensing the feedback of the speed signal, gradually increases the voltage and frequency of the AC power supplied to the armature assembly 625, preferably maintaining a constant V/f ratio to achieve the desired motor and engine speed, while controlling the slip angle. A preferred ratio is 135/400, and is derived from the air gap voltage divided by the rated frequency, which is preferably 400 hz. Once the appropriate rotational speed is reached, the engine controller (not shown) turns on the ignition and fuel for the aircraft engine 800, which allows the engine to run on its own and deliver mechanical power, including power to the rotor 100 shaft.

Figure 6:
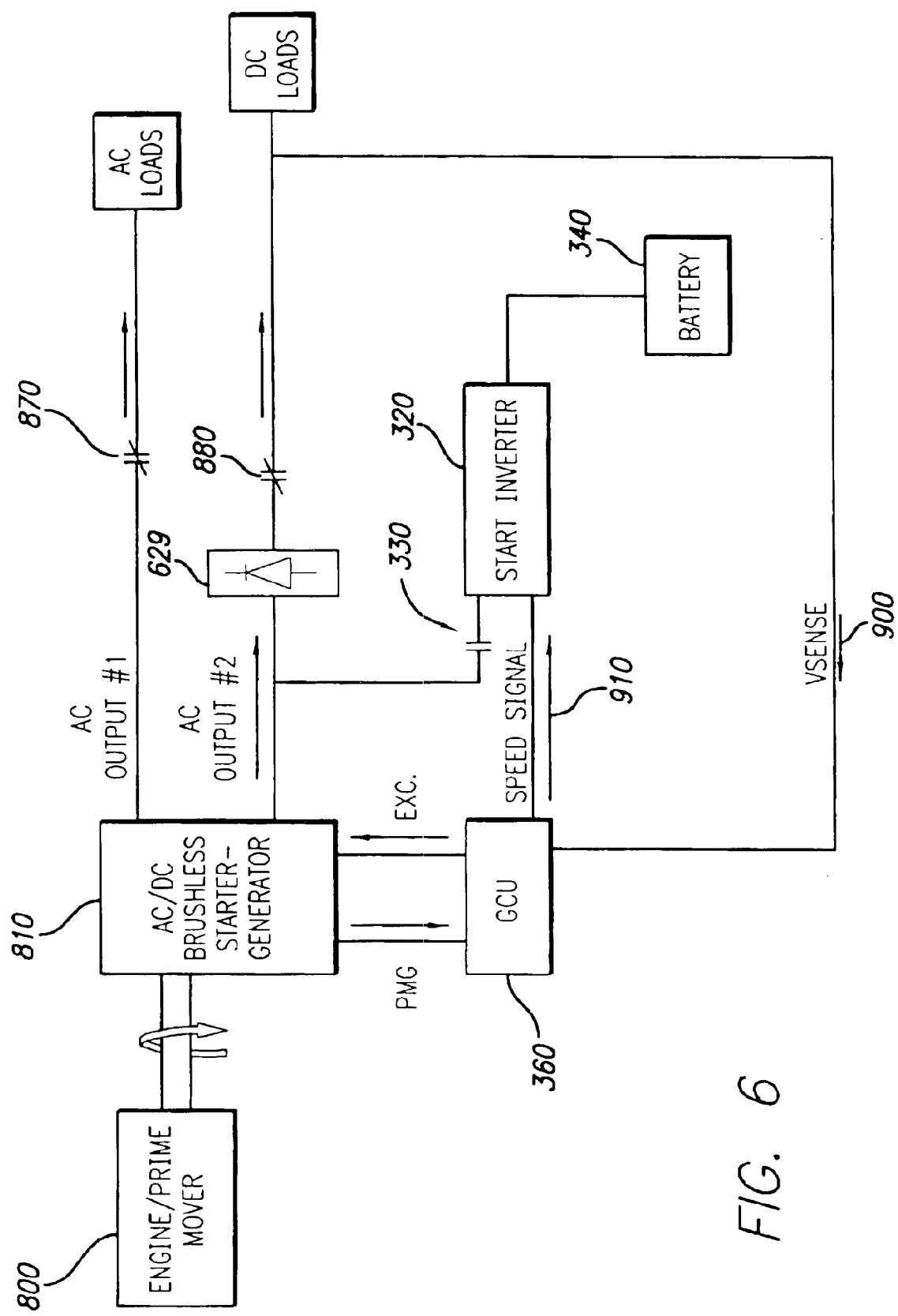
FIG. 6 is a diagram showing the sequence of operation during power generation.

With reference to FIGS. 1 and 6, the operation of the AC/DC Brushless Starter Generator 810 in generator mode can be described as follows. In addition to those components discussed earlier in the specification, the system includes a voltage sensing feedback loop 900 allowing the GCU 360 to monitor the voltage of the DC load provided to the DC output 671. Once the aircraft engine 800 has been started and is capable of sustaining its own speed while providing enough motive power, start contactor 330 is opened, disconnecting the start inverter 320 from the armature assembly 625. The GCU 360 then converts some of the AC power received from the PMG armature 420 into DC, and feeds the DC power back to the exciter magnetic field winding 520 in a controlled fashion. The rotation of the DC field causes it to interact with exciter armature 510 to generate AC power on the rotor 100. The AC power generated by the exciter armature 510 is then fed to rectifier stage 710 for conversion into DC. The DC current 720 from the rectifier stage 720 activates the normally closed solenoid switch 730 so that the contacts 732 are open and most of the DC current 720 is directed to energize the rotating magnetic field 610. The rotating magnetic field 610 is DC. Because it rotates, it is intersected by the armature assemblies 622 and 625, in which it induces AC current. As described earlier, the output of armature assembly 622 is available as unregulated AC at terminals 624a–c, while the output of armature assembly 625 is supplied to rectifier stage 629 and converted to DC power, available at terminals 631a–b. Voltage sensing negative feedback loop 900 is used to provide a voltage signal representative of the voltage at the DC load at outputs 631a–b. The GCU 360 uses the voltage signal to boost or collapse the exciter magnetic field 520 at the stator 200, thereby regulating the current generated in the armature 510, and ultimately the current in the rotating magnetic field 520, and voltage at the DC output 671. Once the desired voltage becomes available at the DC output 671, line contactors 870 and 880 are closed, allowing power to flow to the AC and DC loads.

While preferred embodiments have been illustrated and described in detail in the drawings and foregoing description, such illustrations and descriptions are considered to be exemplary and not restrictive in character, it being understood that only illustrative embodiments have been shown and described and that all changes and modifications that come within the spirit of the invention are desired to be protected. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the features of the disclosure and fall within the spirit and scope of the present disclosure as defined by the appended claims.

I claim:

1. A brushless AC/DC starter generator including:
    a permanent magnet generator, having a rotor including first magnetic field and a stator having a first armature;
    an exciter generator, having a second armature on said rotor, and a second magnetic field on said stator;
    a main generator, having a third magnetic field on said rotor, and third and fourth armature, on said stator;
    a generator control unit electrically connected to said first armature to sense the speed of rotation of said rotor, and electrically connected to said fourth armature to sense the load on said armature, and electrically connected to said second magnetic field, to vary said second magnetic field.

2. The brushless AC/DC starter generator of claim 1, where the first magnetic field is created by at least one permanent magnet, the second magnetic field is generated by an electromagnet and the third magnetic field is generated by an electromagnet.

3. The brushless AC/DC starter generator of claim 1, further including:
    a rectifier electrically connected to said second armature and said third magnetic field, said rectifier converting AC current from the second armature into DC current to the third magnetic field.

4. The brushless AC/DC starter generator of claim 1, further including a rectifier electronically connected to said fourth armature, said rectifier providing at least one output of DC current.

5. The brushless AC/DC starter generator of claim 1, the rotor further including a damper winding.

6. The brushless AC/DC starter generator of claim 5, including a start inverter electrically connected to the third armature, and electrically connected to a power source, said start inverter selectively energizing said fourth armature to create at least one magnetic field, said damper winding positioned to react to said at least one magnetic field.

7. The brushless AC/DC starter generator of claim 6, including contactor to selectively interrupt the electrical connection between said start inverter and said third armature.

8. The brushless AC/DC starter generator of claim 3, where the electrical connection between said second armature and said third magnetic field includes a switch.

9. The brushless AC/DC starter generator of claim 8, where the electrical connection between said second armature and said third magnetic field includes a resistor in parallel with the device creating the third magnetic field.

10. A method of starting an aircraft engine including the steps of:
    providing a brushless AC/DC starter generator including:
    a permanent magnet generator, having a rotor including first magnetic field and a stator having a first armature;
    an exciter generator, having a second armature on said rotor, and a second magnetic field on said stator;
    a main generator, having a third magnetic field on said rotor, and second and third armature, on said stator;
    a generator control unit electrically connected to said first armature to sense the speed of rotation of said rotor, and electrically connected to said third armature to sense the load on said armature, and electrically connected to said second magnetic field, to vary said second magnetic field;

rectifier electrically connected to said second armature and said third magnetic field, said rectifier converting AC current from the second armature into DC current to the third magnetic field, the rotor including a damper winding; and providing electrical power to said third armature to create a magnetic field, said magnetic field created in said third armature interacting with said damper winding.

11. The method of claim 10, including;

sensing the rotational speed of the rotor, and removing the electrical power to the third armature once a desired speed is maintained and the aircraft engine is providing motive force to the rotor.

12. The method of claim 10, the generator control unit is electrically connected to the first armature to sense the speed of rotation of the rotor.

13. The method of claim 11, further including the steps of providing an electrical connection between said first armature and said generator control unit, so as to provide AC power from the permanent magnet; and converting the AC power received from the permanent magnet generator to DC, and supplying the DC power to the second magnetic field, said DC power in the second magnetic field interacting with the second armature to generate AC power.

14. The method claim 13, further including:

providing a first contactor electrically connected to said third armature and a second contactor on said fourth armature, said contactors selectively connecting said second and third armatures with electrical loads.

15. The method of claim 14 further including:

third disconnecting the third and fourth armature from electrical loads prior to providing electrical power to said third armature, and connecting the second and third armatures to electrical loads after a predetermined voltage is available at the third armature.

16. A brushless AC/DC starter generator including a permanent magnet generator, having a permanent magnet on a rotor, and a starter having an armature, said magnet and armature positioned to produce AC current at an output;

an exciter generator, having an armature on the rotor, and an electromagnet on the stator, said electromagnet and armature positioned to produce AC power at an output;

a main generator having an electromagnet on the rotor, a first armature on the stator, and a second armature on the stator, said electromagnet interacting with the first and second armatures to create AC power at a first output electrically connected to said first armature, and at a second output electrically connected to said second armature, and a generator control unit electrically connected to a sensor to sense the speed of rotation of the rotor, and electrically connected to at least one of the main generator outputs to sense the voltage of the output, and electrically connected to the electromagnet of the exciter generator.

17. The apparatus of claim 16, further including:

a rectifier electrically connected to one of the outputs of the main generator, the rectifier having an output for DC current.

18. The apparatus of claim 16, further including a rectifier electrically connected to the output of the exciter generator, said rectifier having a DC output, said DC output electrically connected to said main generator electromagnet.

19. The apparatus of claim 18, further including a damper winding on the rotor, said damper winding being positioned to react to a magnetic field generated in the second armature of the main generator; and a power source electrically connected to the second armature of the main generator to create the magnetic field.

20. The apparatus of claim 19, further including a switch to electrically connect the power source to the second armature of the main generator.

21. The apparatus of claim 20, further including a switch between the main generator electromagnet, and the output of the second armature, said switch creating a shorted path, for current produced by the main generator electromagnet.

* * * * *